(12) United States Patent
Hottebart et al.

(10) Patent No.: US 7,287,565 B2
(45) Date of Patent: Oct. 30, 2007

(54) DEVICE AND METHOD FOR DEALING WITH PHENOMENA OF LOSS OF PRESSURE AND RUNNING FLAT WITH VEHICLE TIRES

(75) Inventors: Francois Hottebart, Royat (FR); Jean-Pierre Pompier, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/927,219

(22) Filed: Aug. 26, 2004

(65) Prior Publication Data

US 2005/0045259 A1    Mar. 3, 2005

Related U.S. Application Data

(63) Continuation of application No. PCT/EP03/01942, filed on Feb. 26, 2003.

(30) Foreign Application Priority Data

Mar. 1, 2002  (FR) ................... 02 02669
Sep. 12, 2003  (WO) ................. 03/074298

(51) Int. Cl.
  *B60C 23/00*  (2006.01)
  *B65B 31/00*  (2006.01)
(52) U.S. Cl. .................. 152/416; 152/521; 141/38
(58) Field of Classification Search ........ 152/415–416, 152/502–504, 509, 519, 521
See application file for complete search history.

(56) References Cited

U.S. PATENT DOCUMENTS

| | | | |
|---|---|---|---|
| 4,054,168 A | 10/1977 | Beers et al. | |
| 4,212,339 A * | 7/1980 | Dobson ...................... | 152/158 |
| 4,343,338 A * | 8/1982 | Hart ........................... | 152/153 |
| 4,619,303 A * | 10/1986 | Bryan et al. ................. | 152/416 |
| 5,070,917 A * | 12/1991 | Ferris et al. ................. | 152/415 |
| 5,178,701 A * | 1/1993 | Taylor ......................... | 152/509 |
| 5,244,027 A * | 9/1993 | Freigang ..................... | 152/416 |
| 5,295,525 A | 3/1994 | Sanda, Jr. ................... | 152/503 |
| 5,516,379 A | 5/1996 | Schultz | |
| 5,634,993 A * | 6/1997 | Drieux et al. ............... | 152/158 |
| 5,648,406 A | 7/1997 | Peelor et al. | |
| 5,895,846 A * | 4/1999 | Chamussy et al. ......... | 73/146.2 |
| 6,750,181 B2 | 6/2004 | Salaun et al. | |
| 6,758,250 B2 * | 7/2004 | Cowart et al. .............. | 152/158 |

FOREIGN PATENT DOCUMENTS

DE    198-00-133 A1    9/1998
WO    WO/02/04237    1/2002

* cited by examiner

*Primary Examiner*—Jason R. Bellinger
(74) *Attorney, Agent, or Firm*—Fitzpatrick, Cella, Harper & Scinto

(57) ABSTRACT

A centralized device for dealing with the phenomena of loss of pressure and running flat with a vehicle tire, including a means external to the mounted assembly, permanently fixed to the vehicle and able to inject or otherwise bring into the internal cavity of the tire at least one active product, also external to the mounted assembly, and able to treat the phenomena of loss of pressure and ultimately running flat.

28 Claims, 5 Drawing Sheets

PRIOR ART

DEVICE AND METHOD FOR DEALING WITH PHENOMENA OF LOSS OF PRESSURE AND RUNNING FLAT WITH VEHICLE TIRES

CROSS-REFERENCE TO RELATED APPLICATIONS

This application is a continuation of International Application No. PCT/EP03/01942, filed Feb. 26, 2003 and published Sep. 12, 2003 in French as International Publication No. WO 03/074298, and further claims priority to French Application No. 02/02669, filed Mar. 1, 2002.

BACKGROUND OF THE INVENTION

1. Field of the Invention

The present invention concerns the technical sector of vehicles provided with tires and on-board safety systems concerning them. "Vehicles" will, throughout the present application, including the claims, mean both light vehicles (LVs), such as private cars or vehicles, and utility vehicles or heavy vehicles such as lorries and "heavy goods vehicles" (HGVs), their trailers, forestry vehicles, civil engineering machinery, military or emergency vehicles, and the like.

2. Description of the Related Art

The general technical problem which is posed is that of accidental pressure loss (APL) which can go as far as leading to running flat, with vehicles equipped with tires. The phenomenon of APL and, ultimately, running flat designates, as a person skilled in the art knows, the running of the vehicle on at least one tire whose inflation pressure becomes or has become, for any reason whatsoever, very much less than the pressure provided for by the manufacturer, that is to say the case of running where the inflation pressure drops abnormally with respect to the nominal operating pressure, referred to as the service pressure, the inflation pressure even being able to become zero.

The causes of these phenomena are very numerous: running over a perforating object, impact on a shape of the "pothole" type or the edge of a pavement, deterioration of the valve, damage to the rim (dented rim with loss of seal at the seat), etc, and are well known.

Amongst the devices for combating these problems of serious loss of pressure and running flat and their consequences there figure in particular devices for sealing the puncture and tires with the ability to run flat on a support.

The devices for sealing the puncture are based on so-called "sealing products" whose function is to block the hole giving rise to the perforation of the tire. In order to be effective, these sealing products must be sufficiently adherent to the internal surface of the tire and to the object responsible for the puncture, if this object remains locked in the tire. They must also be capable of withstanding the inflation pressures and the forces sustained in running. Such products are usually relatively viscous.

The patent U.S. Pat. No. 5,295,525 presents such a sealing product intended to be disposed, during the manufacture of the tire for example, on the surface of the internal cavity thereof. These products can be effective for holes of limited size, but this efficacy decreases rapidly over time and the presence of these products in the tires greatly complicates their mounting and removal. Consequently the presence in a tire of such sealing coatings does not completely eliminate the risk of a user having to stop in the event of a puncture.

The patent U.S. Pat. No. 5,648,406 presents a sealing product intended to be introduced into the internal cavity of a tire only after a puncture. The sealing product is then usually contained in an aerosol can and is introduced into the internal cavity through the inflation valve and applied against the internal surface of the tire by virtue of the action of a compressed gas present in the aerosol can. In general, these aerosol cans are used by the user. They have the advantage of being less expensive, less heavy and less bulky than a spare wheel, but require the stoppage of the vehicle, which represents an extremely serious drawback for the user. In addition, these anti-puncture aerosol cans are not effective in all cases, in particular in certain cases of rapid puncture that is to say in the case where a large perforation has occurred.

More recently, tires with the ability to run flat have appeared on the motor vehicle market. The majority of these tires are equipped with a pressure measurer intended to inform the user that one or more of his tires have suffered or are suffering an APL. The majority of these devices also measure the temperature of the internal air so as to correct the value of the pressure from the variations in value of the temperature, according to the law of perfect gases.

Some of these tires or mounted assemblies, that is to say tire and rim assembly, comprise a "support" disposed around the rim, in the internal cavity of the tire. Amongst this type of mounted assembly with the ability to run flat, the PAX System can be cited. Such a support consists for example of a vulcanized rubber material which can be reinforced by textile or metallic cable reinforcements.

In the event of abnormally low pressure, the interior of the tire crown comes into contact with this support. In doing this, the support limits the flexing of the tire flat and makes it possible to continue running under given conditions of maximum speed and distance.

However, during such running flat, the contacts between the internal wall of the tire crown and the external wall of the support take place with significant relative sliding between these two walls. This relative sliding is due to the fact that the distance traveled in one turn of the wheel by the tire crown is greater than that traveled by the exterior of the support with which it is in contact. A difference in running radius is spoken of. In order to limit the friction forces due to these relative slidings and their consequences in terms of heating and mechanical damage, it is possible to use a lubricant inside the internal cavity of the tire. This lubricant will reduce the coefficient of friction between the interior of the tire crown and the exterior of the support and enable the two bodies to slide with respect to each other whilst limiting the mechanical damage and heating. The lubricant can be disposed on the surface of the support when the mounted assembly is manufactured and/or assembled, and can also be placed in adapted receptacles in order to be opened only in the event of need (see U.S. Pat. No. 4,054,168, by way of example).

The performance of this lubricant is important for the flat running to take place correctly. In many cases, as the quantity of lubricant disposed inside the internal cavity of the tire is necessarily limited, if it were possible to increase the quantity of lubricant, the range of the mounted assembly in running flat would be increased. It should also be noted that the presence of this lubricant can complicate any work involved in mounting and removing the mounted assembly.

The document WO 02/04237 presents a lubricant composition which can be used for lubricating an interface between a tire and a safety support. This lubricating composition comprises essentially on the one hand a lubricating agent including glycerin and on the other hand a polysaccharide intended to thicken this lubricating agent.

Centralized inflation devices called "CTIS" (Central Tire Inflation System) have been appearing on the market for several decades. These devices enable the driver of a vehicle to modify the inflation pressure of the tires on his vehicle according in particular to the adhesion conditions encountered (see U.S. Pat. No. 5,516,379 by way of example).

These devices have the advantage of allowing periodic checking of the inflation pressure of the tires on the vehicle and thus to supplement the quantity of air contained in one of the tires when there is a slight leak for example.

BRIEF SUMMARY OF THE INVENTION

The invention concerns in its more general concept, which constitutes in itself a break compared with the prior art, a centralized device for dealing with phenomena of loss of pressure and running flat with a vehicle tire, comprising means external to the mounted assembly, the external means being permanently fixed to the vehicle and able to inject or otherwise bring into the internal cavity of the tire at least one active product, also external to the mounted assembly, and able to deal with the phenomena of loss of pressure and ultimately flat running.

A person skilled in the art naturally knows that the mounted assembly designates the assembly formed by a tire mounted on a rim and inflated to a certain pressure, in general the so-called "service" pressure.

The invention proposes a device as described above which is capable of dealing effectively, without stopping the vehicle, and without external means or aid, both slow (small perforations) and fast (large perforations) pressure loss situations, for which no satisfactory system was known, with the possibility of preventing flat running, which is a very important advantage, and also, when flat running is inevitable, to very greatly reduce the drawbacks thereof, on tires with or without "safety supports". All these properties and capabilities are brought together in the present application, including in the claims, by a term such as "dealing with phenomena of loss of pressure and running flat" or a similar term.

Such a combination of performance and advantages has never been achieved or approached in the prior art. It has also been seen that, even when the prior art afforded very partial, isolated and/or temporary solutions, the efficacy was reduced and was always accompanied by drawbacks which in practice limited the prior art to impractical theoretical solutions, systems with reservoirs incorporated in the tire or of very low utility, such as anti-puncture cans.

Compared with this prior art, a person skilled in the art will easily understand that the present invention forms an innovation constituting a break.

The active product or products are chosen from the group of sealing products and lubricating products.

The external means can also comprise means able to inject or otherwise bring an adapted additive, also external to the mounted assembly.

The "adapted additives" are chosen from amongst all the agents capable of, or adapted for, improving the active product injection conditions, the action of these active products, and the conditions for dealing with the loss of pressure and possibly running flat.

In practice, these adapted additives will be chosen from amongst active product rheology modifiers, in particular diluents and thickeners, the agents for cleaning pipes and manifolds in the system which will be described below, anti-corrosion agents, anti-oxidants and all agents capable of attenuating or eliminating the physical consequences (rise in temperature etc) and/or mechanical consequences (sagging, damage to the casing, etc) well known with regard to running flat, with or without support.

There can also be cited amongst these adapted additives an agent capable of cooling the casing such as for example an easily vaporizable cooling fluid such as an alcohol or water, a gas or compressed air, or a hydrocarbon gas which is non-toxic and not detrimental to the environment, possibly containing a fluid whose vaporization or expansion reduces the temperature, such as water or a lower alcohol, a light hydrocarbon etc.

According to the invention, the means external to the mounted assembly comprise at least one reservoir or a source of active products intended to be injected or otherwise brought into the internal cavity of the tire in the event of loss of pressure or running flat.

The external means can also comprise means of injecting the active product into the internal cavity of the tire.

These injection means can comprise the use of air or other appropriate gas, inert, such as nitrogen, or a hydrocarbon which is non-toxic and not detrimental to the environment, and non-flammable, in the compressed state.

The external means can also comprise a reserve or source of cooling products intended to be injected or otherwise brought into the internal cavity of the tire in the event of loss of pressure or running flat.

This cooling product can, preferentially, be air, nitrogen or an equivalent gas.

Preferentially, the external means comprise or cooperate with means of measuring the pressure or other characteristics representative of the internal air of the tire to generate at least one "representative signal" on the state of the inflation air in the internal cavity of the tire, that is to say of the pressure and/or of the variations in the pressure over time (hereinafter referred to as the "pressure signal"). There may also be means of controlling the feed or injection means comprising at least a memory, a comparator and a control program, adapted to receive and process the pressure signal; compare it with a pressure reference loaded in the memory; and decide on, and program, according to the result of the comparison, the feeding or injection into the tire of air or other compressed gas and/or active product, according to variable combinations of quantities, proportions and rates or doses, adapted best to respond, according to the program and the memory, to the pressure signal received.

The pressure reference preferably comprises indications on pressure value, difference in pressure with respect to a reference pressure, in particular the service pressure, and rate of pressure variation, that is to say $$\frac{\Delta p}{\Delta t}.$$

The means of measuring the characteristics of the internal air of the tire, generating the "pressure signal," can be situated on or in the mounted assembly. They can also be external to the mounted assembly.

Preferentially, the means for generating the pressure "signal" incorporates means of measuring the temperature of the air in the internal cavity of the tire and its change over time.

According to a preferred embodiment, the means for injecting the active product and/or cooling fluid comprise a generator or source of air or other compressed gas and pipes and their valves or cocks forming a connection circuit between the generator or source, the reservoirs and the inside of the internal cavity of the tire.

The generator or source of compressed air can consist of a reservoir of compressed air such as atmospheric air or an inert gas such as nitrogen, or a hydrocarbon which is non-toxic, non-flammable and not detrimental to the environment. It can also consist of a compressor.

Advantageously, the compressor supplying the inflation air is adapted also to supply the cooling air.

The invention concerns, according to a preferred variant, a device comprising a centralized system for inflating at least one tire on a vehicle or CTIS consisting essentially of: a central control unit; a compressor producing compressed air or gas; a device for regulating the pressure at a fixed value, or controlled by the central unit; and means of pneumatic connection between the compressor, the pressure regulation device and the internal cavity of the tire. The device also comprises at least one active product reservoir connected by pipes and cocks or valves to the components of the CTIS and in which the central unit comprises a memory and a program both adapted to manage and implement variable combinations of quantities, proportions and rates or doses of inflation air, active product and/or adapted additive, in particular sealing product and/or lubricant and/or adapted additives such as cleaning or anti-corrosion agents, cooling air (or gas), or a cooling fluid such as water or an alcohol or similar products.

It will have been understood that, according to the invention, the compressed air or gas (as an "active product") fulfils both the function of vehicle or propellant for the other fluid or fluids, and agent combating the deflation of the tire.

Another object of the invention is a centralized method for dealing with phenomena of loss of pressure and running flat with a tire on a vehicle, using means of measuring the pressure or other characteristics representative of the internal air of the tire to generate at least one "representative signal" on the state of the inflation air in the internal cavity of the tire, that is to say the pressure and/or variations in the pressure over time (hereinafter referred to as the "pressure signal" or "PS"). There may also be means of measuring the internal temperature of the air in the tire and means of feeding or injecting air or other compressed gas and at least one active product into the internal cavity of a tire. There may also be means of controlling the feed or injection means comprising at least a memory, a comparator and a control program, adapted for receiving and processing the pressure signal and comparing it with a pressure reference (PR) loaded in the memory. The program may make it possible to decide on, and program, according to the result of the comparison, the feeding or injection of air or other compressed gas, active product and/or adapted additive into the tire, according to variable combinations of quantities, proportions and flow rates or doses, adapted to best respond, according to the program and the memory, to the pressure signal received.

Preferentially, the pressure reference (PR) comprises information in terms of pressure value, difference in pressure with respect to a reference pressure, in particular the service pressure, and rate of pressure variation, that is to say $$\frac{\Delta p}{\Delta t}.$$

In one advantageous embodiment, when the result of the comparison between the pressure signal (PS) and the pressure reference (PR) is abnormal, the control means have the feed or injection means send a predetermined dose of active sealing product into the internal cavity of the tire.

Preferentially, the control means also transmit a "puncture alarm" to the driver.

According to the method of the invention, the result of the comparison between the pressure signal (PS) and the pressure reference (PR) can be considered to be abnormal when the difference between the measured pressure and the set pressure is greater than a given threshold.

Alternatively or in a complementary fashion, the result of the comparison between the pressure signal (PS) and the pressure reference (PR) can be considered to be abnormal when the variation in pressure measured over a given time is greater than a given threshold.

As soon as such a puncture is identified, the method according to the invention sends into the internal cavity of the tire a dose of sealing product which will make it possible, in very many cases, to close off the leak and thus to continue the running of the vehicle in a satisfactory manner.

On the other hand, when the result of the comparison between the pressure signal (PS) and the pressure reference (PR) indicates flat-running (FR) conditions, the control means cause the feed or injection means to send a predetermined dose of active lubricating product into the internal cavity of the tire.

It can be considered that flat-running conditions are detected when the inflation pressure in the internal cavity of the tire becomes less than approximately 0.3 bar. This means that the above repair strategy has not been sufficiently effective or has failed and it is then necessary to prepare to limit the effects of contact between the sidewalls of the tire and the wheel rim hooks, or between the tire tread and a safety support when the mounted assembly is provided with one. This is the objective of the lubricating product sent into the internal cavity of the tire.

The control means preferably also transmit a "flat-running alarm" to the driver.

It is then preferable to make provision for the control means to also send, by means of the feed or injection means, a small flow of air or other cooling gas into the internal cavity of the tire.

This small flow of air has two very substantial advantages; the first is to limit the heating in the internal cavity and the second is to preserve a minimum pressure in the internal cavity, often around 0.1 bar at a minimum, which will substantially relieve the friction forces and thus participate in the reduction in heating.

The method according to the invention then preferably makes provision for means of measuring the temperature of the air in the internal cavity of the tire to transmit the temperature to the control means and if, having regard to the conditions of use (load, speed, external temperature etc), the control means find that this temperature value is above a given threshold, then the means send one or more additional doses of lubricant. Such a first threshold can be around 80 degrees Celsius.

However, when the control means find that the value of the temperature in the internal cavity of the tire is higher than a second predetermined threshold, they transmit to the driver of the vehicle an alarm requiring immediate stoppage. Such a threshold is around 100 to 110 degrees Celsius.

BRIEF DESCRIPTION OF THE SEVERAL VIEWS OF THE DRAWING

Several embodiments of the invention will now be described with the help of the accompanying drawing, in which.

DETAILED DESCRIPTION OF THE INVENTION

Figure 1:
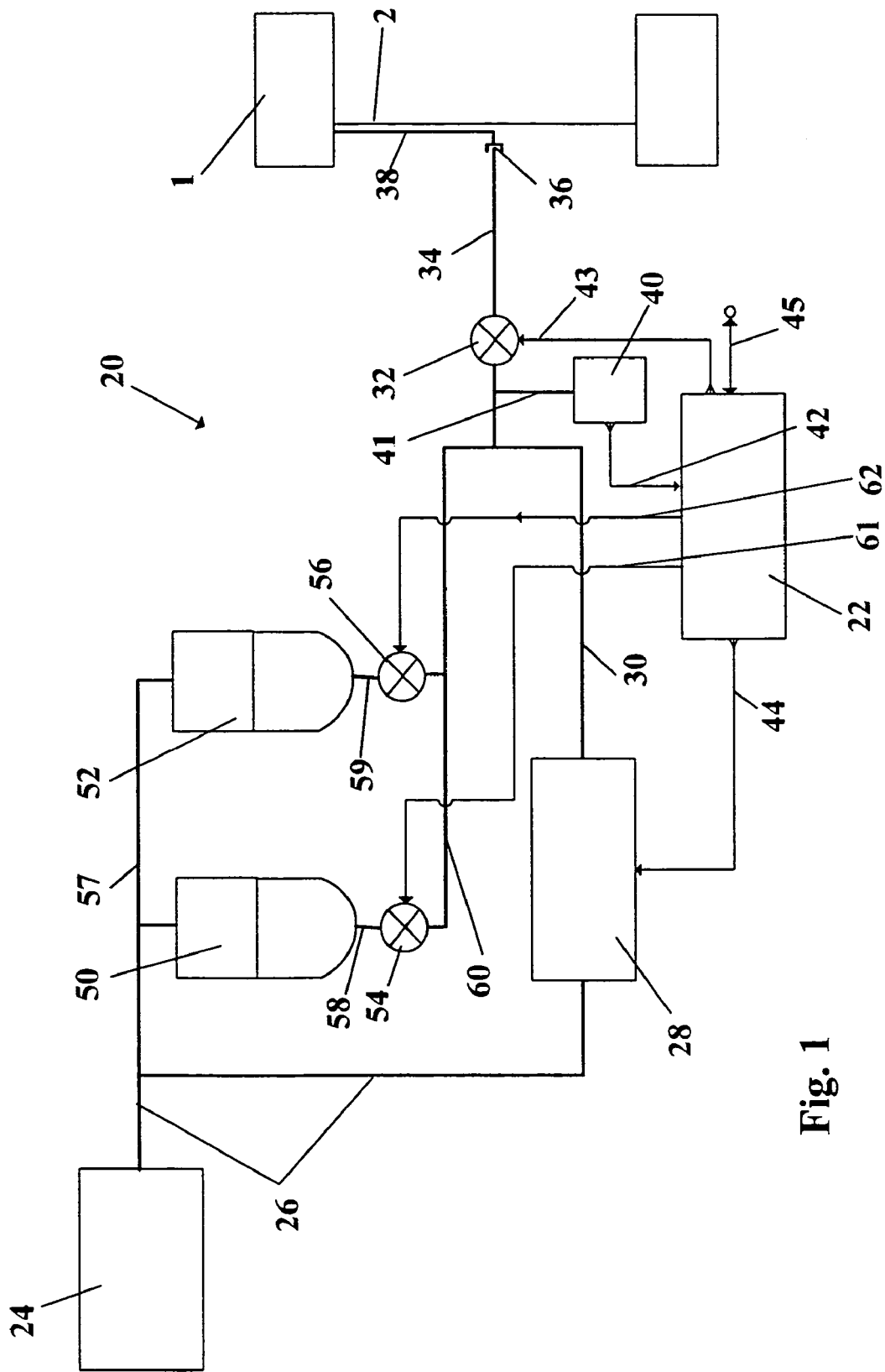
FIG. 1 presents a simplified diagram of a first device for implementing the invention.

FIG. 1 presents schematically a first example embodiment of a centralized device according to the invention. This device comprises all the elements of a conventional centralized inflation device (CTIS) and a certain number of specific supplementary elements. The centralized inflation device or CTIS 20 comprises principally the following elements. There is a central control unit 22, which functions normally with a microprocessor and receives control signals from a control panel (not shown) available to the operator of the vehicle as well as various sensors. A compressor 24 supplies compressed air in a pipe 26 at a normal pressure of around 6 bar. A pipe 26 is connected to a pressure regulation device 28, which can regulate the pressure at a fixed or variable value according to the control of the central unit 22 and the demands of the operator. A pipe 30 is placed at the output of the pressure regulation device 28. In this pipe 30, the maximum pressure is regulated by the device 28 at a given variable value. The pipe 30 is connected to a pneumatic distributor composed of one cock or valve per vehicle wheel. In the diagram in FIG. 1, only one cock 32 has been shown, managing the distribution of the compressed air as far as the mounted assembly 1, 2 shown. At the outlet from the cock 32, the pipe 34 directs the compressed air as far as a rotary seal 36, which conducts the compressed air from the shaft of the static axle (stator) to the rotationally mobile wheel carrier (rotor) of the mounted assembly 1, 2 shown. At the outlet from the rotary seal 36 there is a pipe 38 connecting the rotary seal 36 to the inside of the internal cavity of the mounted assembly consisting of the tire 1 and the wheel 2. A pressure sensor 40 measures the pressure of the air in the pipe 30, between the pressure regulation device 28 and the cock 32, via the pipe 41.

This CTIS 20 also commonly comprises means for opening the pipes 30 and 34 to atmosphere when the system is not in operation or when it is wished to reduce the inflation pressure. These means commonly comprise a wheel valve disposed between the rotary seal and the internal cavity of the tire to make it possible not to leave the rotary seal continuously under pressure and thus increase its service life. To simplify the drawing, this valve is not shown.

The central unit 22 is electrically connected to the control panel by the conductor 45, to the pressure regulation device 28 by the conductor 44, and to the cock 32 by the conductor 43. The central unit 22 also receives from the pressure sensor 40 an electrical signal representing the pressure of the compressed air in the pipe 30 via the conductor 42.

A CTIS device of this type makes it possible to change the pressure in the internal cavity of the tire as far as a given value chosen by the operator or the control program of the central unit 22. It also makes it possible to periodically check the value of the pressure in the internal cavity of the tire and to correct it if necessary. These operations are performed by opening the cock 32, which puts the internal cavity of the tire 1, the pipe 30 and the pressure sensor 40 in pneumatic communication. According to the inflation pressure value measured, the central unit chooses to initiate or not a sequence of inflation or deflation of the internal cavity of the tire.

The device according to the invention comprises several supplementary elements of the above CTIS. A first reservoir 50 of active product, for example sealing substance, is provided. This reservoir is connected to the compressor 24 by the pipe 57 and a branch of the pipe 26. At the outlet from the reservoir 50 a pipe 58 leads to a cock 54, itself connected by a pipe 60 to the connection pipe 30 between the pressure regulation device 28 and the set of cocks 32 leading to the axles and to the internal cavities of the mounted assemblies. A second reservoir 52 of active product, for example lubricant, is provided. This second reservoir is also connected to the compressor 24 by the pipe 57, a branch of the pipe 26. At the outlet from the reservoir 52, a pipe 59 leads to a cock 56, itself connected by the pipe 60 to the pipe 30. The cocks 54 and 56 are connected and actuated by the central control unit 22 by means of the conductors 61 and 62.

It should be noted that the two reservoirs of active products, 50 and 52, are connected to the compressor 24, and this enables them to be continuously pressurized to the outlet pressure of the compressor, that is to say around 6 bar.

In normal operation, the cocks 54 and 56 are closed.

Figure 2:
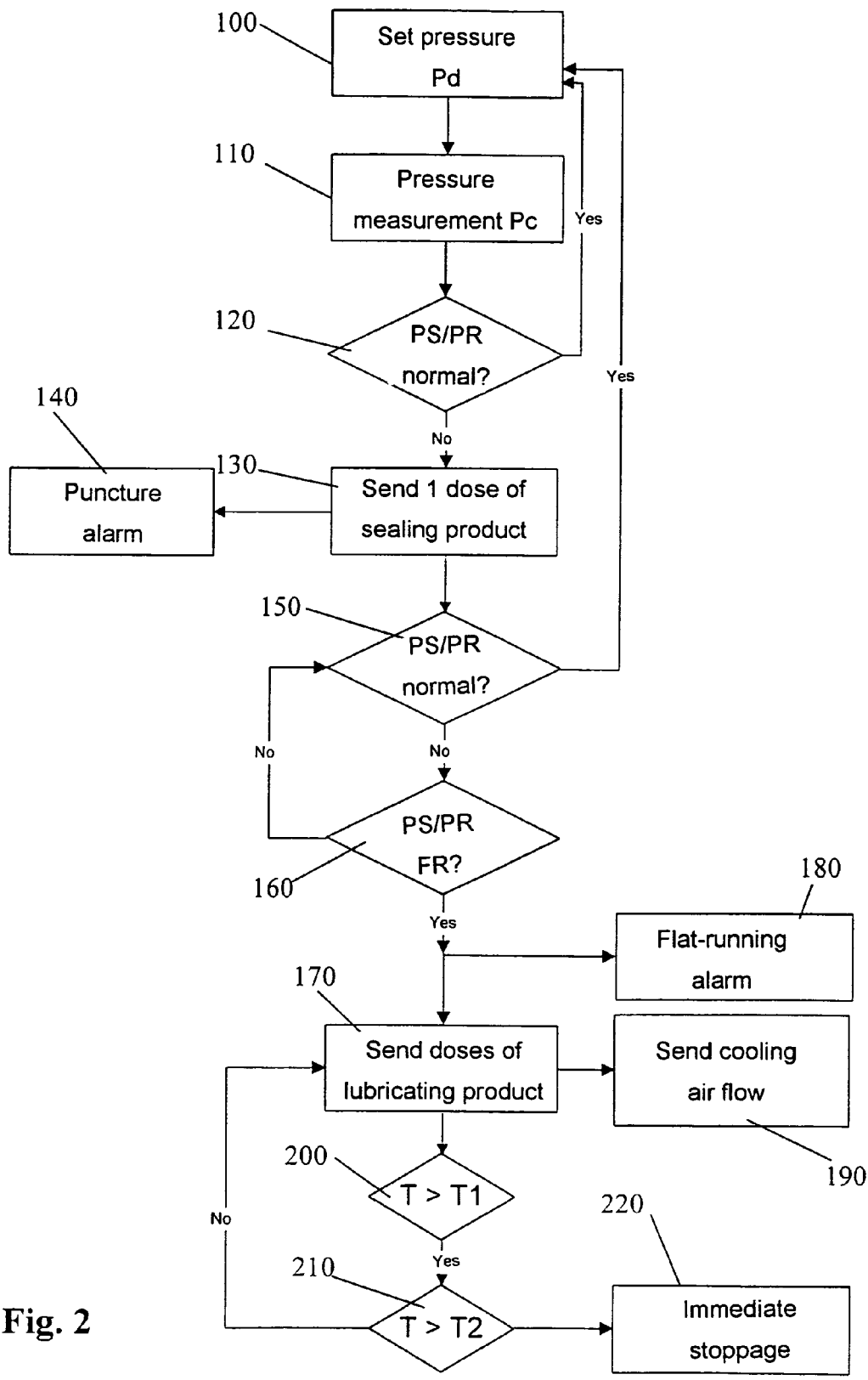
FIG. 2 presents, in the form of a flow diagram, an example of implementation of the method according to the invention.

FIG. 2 illustrates the functioning of the device according to the invention.

At step 100, the device is in normal operation and regulates the inflation pressure of the internal cavity of the tire 1 to a value close to a given value Pd. To this end, the central unit 22 periodically automatically triggers a check on the inflation pressure of the tire 1—step 110. Then a comparison is made between the pressure signal SP measured and the pressure reference PR of the memory of the central unit 22 (step 120). If during one of these checks the measured pressure Pc is less by a quantity greater than a given threshold a, around 0.3 bar, or if a reduction is noted in the inflation pressure of a tire greater than a threshold a pre-recorded in the reference included in the memory of the central unit, the pressure signal PS is considered to be abnormal. It is also possible to use as a test of the presence of a leak in a tire the comparison of the variation in pressure over time between two tires on the same axle, as described in the patent U.S. Pat. No. 5,895,846. In the contrary case, the normal test and regulation cycle continues.

As soon as a leak is detected in relation to an abnormal pressure signal, the central unit 22 triggers the sending into the cavity of the tire 1 of a given dose of sealing product present in the reservoir 50 by opening the cock 54 for a short period (step 130). As the reservoir is pressurized to approximately 6 bar, opening the cock 54 will project into the pipe 30 a given quantity of sealing product which is a function of the duration of opening of the cock. Next the central unit 22 will bring the pressure in this pipe 30 to a value (of around 4 bar for example) such that opening the cock 32 will cause the appearance of a flow of air between the compressor, the regulation device 28 and the internal cavity of the tire. It is this flow of air which will propel the dose of sealing product through the cock 32, the pipe 34, the rotary seal 36 and the pipe 38 and thus a large part of the dose sent reaches the cavity of the tire 1. After having created this flow of air for a sufficient length of time for the dose of sealing product to be practically completely conveyed into the internal cavity, the resulting pressure in this internal cavity is checked, and, if necessary, the internal pressure is adjusted downwards or upwards. This active sealing product is effective for blocking holes of small size in the wall of the tire 1. At the same time, the central unit 22 sends a "puncture alarm" message to the control panel (step 140) in order to warn the driver of the vehicle of the incident. The value of the inflation pressure Pc in the tire 1 is then checked periodically in order to determine whether or not the pressure signal is remaining abnormal (step 150) and if it remains abnormal checks are also carried out in relation to flat-running (FR) conditions (step 160). Such conditions correspond for example to very low pressures of around 0.3 bar in the internal cavity of the tire. If the pressure Pc rises again in order to be equal or close to Pd, this repair strategy is stopped and the normal functioning of the CTIS resumes at step 100. If on the other hand the pressure Pc continues to drop whilst remaining higher than the threshold FR, that is to say greater than 0.3 bar, one or more supplementary doses of sealing product are sent once again. During this time, a driver alarm is maintained with adapted restrictions on use of the vehicle (speed etc).

When the result of step 160 indicates that the inflation pressure is becoming very low and below a second FR threshold of around 0.3 bar, this indicates that the repair strategy has failed and that flat running will shortly occur. The central unit 22 then periodically triggers the sending into the cavity of the tire 1 of doses of a second active product present in the reservoir 52, a lubricating product (step 170). The object of this product is to reduce the friction of the sidewalls of the tire on the rim hook and substantially increases the distance traveled under these conditions before the tire is destroyed. At the same time, the driver of the vehicle is warned of the imminence of the flat running and he is given the appropriate recommendations in terms of maximum speed and distance which can be envisaged (step 180). Advantageously a flow of air is also sent in order to limit the heating in the cavity of the tire 1 due to the friction (step 190). This air flow also has the advantage of maintaining in the cavity of the tire a minimum differential pressure, often around 0.1 bar, for example. This cooling effect as well as the minimum pressure are very noteworthy with regard to the service life of the tire and/or of the safety support in the case of running flat.

When the system is also equipped with means for measuring and monitoring the temperature of the air in the internal cavity of the tire, it is advantageous to control the sending of the doses of lubricant according to this measured temperature (steps 200, 210). When it is found that this temperature T exceeds a first threshold, for example of 80 degrees Celsius, a dose is sent. Finally, when the temperature exceeds a second threshold above 100 degrees Celsius, this means that an immediate stoppage of the vehicle is now obligatory and this is indicated to the driver (step 220).

Figure 3:
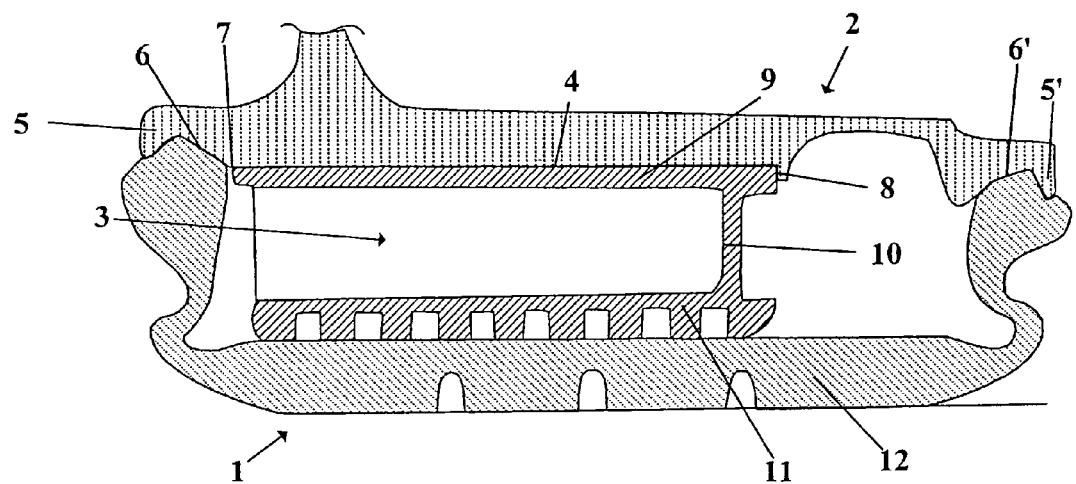
FIG. 3 presents a partial axial section of a mounted assembly equipped with a safety support.

There can be seen in FIG. 3 a mounted assembly comprising a tire 1, a wheel rim 2 and a safety support 3 disposed around the surface 4 of the rim 2. The special geometry of this wheel rim 2 is in particular described in the patent U.S. Pat. No. 5,634,993. It has two rim edges, 5 external and 5' internal, two bead seats, 6 external and 6' internal, of different diameters, and a surface 4 with an engagement edge 7 and a locking stop 8. This rim is particularly adapted for the easy fitting of this safety support 3. This assembly allows running despite a significant drop in pressure in the tire 1. The support comprises two main parts, a base 9 intended to surround the surface 4 of the rim 2 and a body 10 connected to the base 9. The body 10 comprises a crown 111 intended to come into contact with the tread 12 of the tire 1 in the event of zero or very low inflation pressure—this is what is shown in FIG. 3. The body 10 can have extremely varied shapes.

Figure 4:
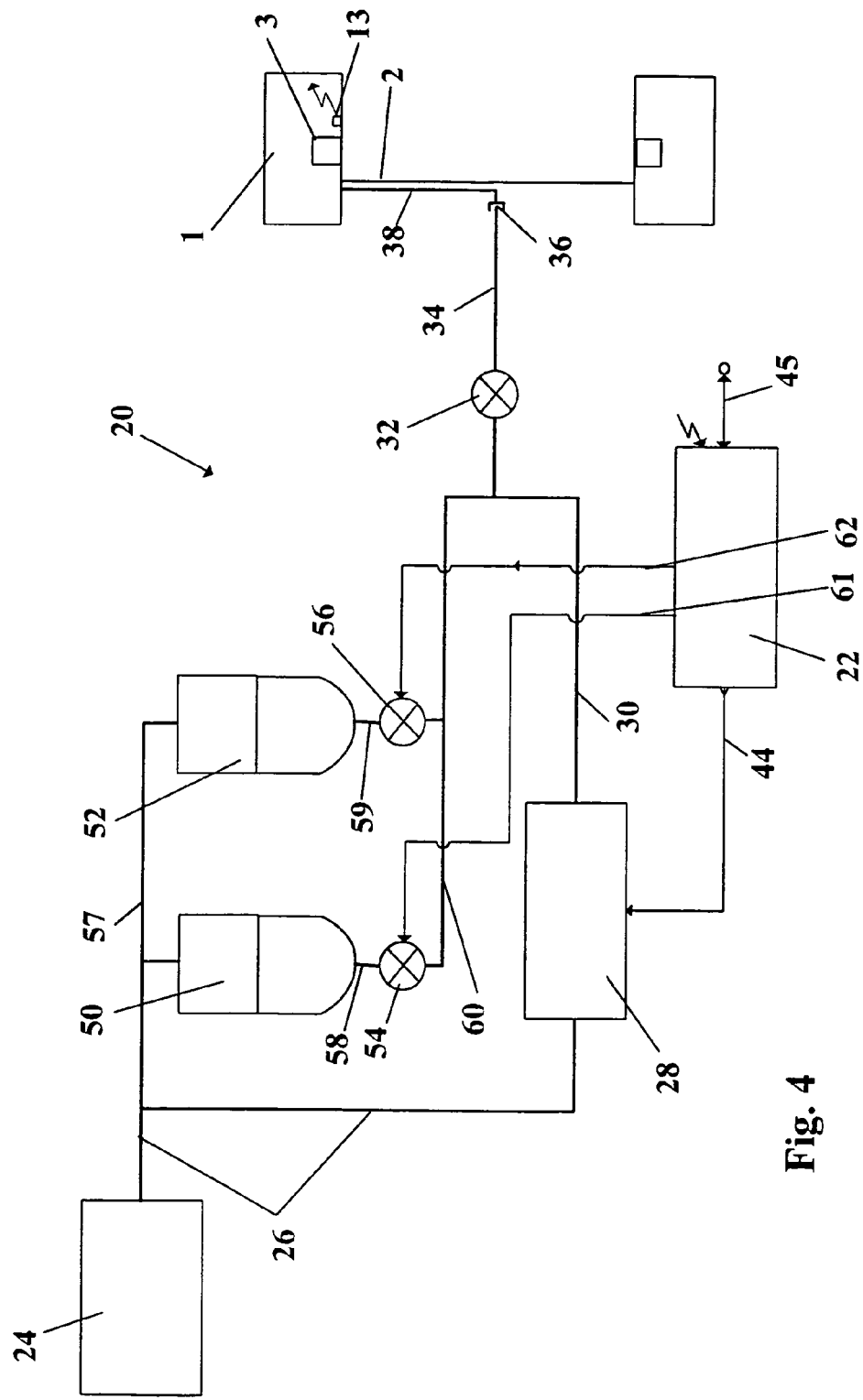
FIG. 4 presents a simplified diagram of a second device implementing the invention.

FIG. 4 presents a device 70 similar to that in FIG. 1 but adapted to function with mounted assemblies as depicted in FIG. 3; the mounted assembly is depicted highly schematically with the tire 1 and the wheel 2; inside the internal cavity of the tire 1 there is a support 3 as well as a wheel module 13; this wheel module usually comprises a pressure sensor and a temperature sensor intended to measure the pressure and temperature in the internal cavity of the tire as well as means for transmitting the measured data to the central control unit 22, for example by radio.

The presence of the wheel module 13 in the internal cavity of the tire 1 makes it possible to monitor in a much more regular fashion the change in the inflation pressure and the temperature in this cavity. The presence of the safety support 3 in the cavity of the tire 1 guarantees for the driver of the vehicle a much greater ability to run flat, around several hundreds of kilometers under appropriate speed and load conditions instead of a few hundreds of meters or a few kilometers with standard tires.

Tests are being carried out which show the advantage of the device and method according to the invention.

The first test concerns the treatment of losses of inflation pressure due to punctures.

The conditions of this test were as follows: vehicle: Renault Scenic 1.9 dTi; tire: PAX 195-620 R 420 Spacity; support: 115 mm (width) 420 mm (diameter) 45 mm (height) produced from rubber material); and wheel: 185 mm (width)—420 mm (diameter) in aluminum alloy. The sealing product composition was as presented in the document U.S. Pat. No. 5,295,525, the viscosity of which is adapted to be able to be propelled through the pipes of the device. The lubricating product composition was similar to those of the document WO 02/04237, which is based on glycerin, water, polysaccharide (xanthan gum) and a surfactant such as sodium alkyl aryl sulphonate.

Table 1 presents the results obtained during simulated punctures.

The first type of puncture is a slow puncture. In this case, reinflation by itself compensates for such a leak. It has been found that this type of puncture occurs in 40% of observed punctures.

The second type of puncture is a slow puncture which is compensated for by reinflation until the object which caused the puncture is ejected. This ejection causes a marked increase in the size of the opening and thus in the leakage air flow. The device according to the invention then sends one or more doses of sealing product and it is found that, in 30% of cases, the closure of the hole makes it possible to reseal the tire and thus continue the planned journey normally.

It is only in 10% of cases (type No. 3) that, after the ejection of the object which caused the puncture, the sending of doses of sealing product does not make it possible to regain a seal on the tire and that it is then inevitable to once again be in a situation of running flat if travel is continued.

TABLE 1

| Type | Description | % of cases |
|---|---|---|
| 1 | Slow punctures compensated for by reinflation | 40% |
| 2 | Slow punctures compensation for by reinflation until the puncture object is ejected. On ejection, the sealing product makes it possible to regain a seal on the cover. | 30% |

TABLE 1-continued

| Type | Description | % of cases |
|---|---|---|
| 3 | Slow punctures compensated for by reinflation until the puncture object is ejected. On ejection, the sealing product does not make it possible to regain a seal on the cover. Only running flat makes it possible to continue travel. | 10% |
| 4 | Slow punctures not compensated for by reinflation. Closure makes it possible to continue travel. | 10% |
| 5 | Slow punctures not compensated for by reinflation. The sealing product does not make it possible to regain a seal on the cover. Only running flat makes it possible to continue travel. | 10% |

In the case of slow punctures which are not compensated for by the reinflation strategy (20% of puncture cases), it is found that in half of the cases sending the sealing product makes it possible to regain a seal on the tire.

It is thus found that, in approximately 80% of the types of puncture usually observed, the device and the method of the invention make it possible, by the successive application of compensation strategies and then of repair, to maintain or regain a normal inflation pressure in the tire cavity and thus to be able to continue the planned journey normally.

In 20% of cases of punctures, these two strategies do not make it possible to avoid arriving in a flat-running situation.

A second test shows the advantage of a lubricant in the case of running flat. This test took place without support under the following conditions:
  Vehicle: Peugeot 405;
  Cover: PAX 185-590 R 400;
  Wheel: 175 mm (width)—400 mm (diameter);
  Lubricant: identical to the previous test;
  Quantity: 50 g;
  Load: 338 daN;
  Position of flat tire: rear left;
  Residual pressure of flat tire: 0 bar (valve removed);
  Speed: 40 km/h.

Without lubricant, the range of obtained under these conditions until there was complete destruction of the tire was 4.5 km; on the other hand, with lubricant, this range was increased to 50 km.

Finally, the following tests were carried out when running flat with support, under the following conditions:
  vehicle: Renault Scenic 1.9 dTi;
  tire: PAX 195-620 R 420 Spacity;
  support: 115 mm (width)—420 mm (diameter) made from rubber material;
  wheel: 185 mm (width)—420 mm (diameter) (aluminum alloy);
  sealing product: identical to the previous test;
  lubricant: identical to the previous test;
  load: 425 daN;
  position of flat tire: front right;
  residual pressure in flat tire: 0 bar (valve removed);
  circuit: motorway, constant speed 100 km/h; and
  outside temperature: 20° C.

TABLE 2

| Description | System with internal lubrication | System with external lubrication |
|---|---|---|
| Quantity of internal lubricant (disposed on the crown of the cover on mounting) | 20 g. | 0 g. |
| Quantity of external lubricant (in the lubricant reservoir) | 0 g. | 100 g. |
| Quantity of lubricant in the cover at the start of flat running | 20 g. | 75 g. (1) |
| Range running flat | 275 km | 430 km |

(1) Some of the lubricant was not brought by the pressure and remained in the pipe or cavity of the CTIS.

This test compares running flat on support with lubricant disposed in the internal cavity of the tire or supplied by a device according to the invention.

The distance traveled with the lubricant introduced into the internal cavity of the tire by a device according to the invention is 430 km instead of 275 km in the other case. This result shows the advantage of being able to increase on demand the quantity of lubricating product in order to be able to substantially increase the life of the system when running flat.

Figure 5:
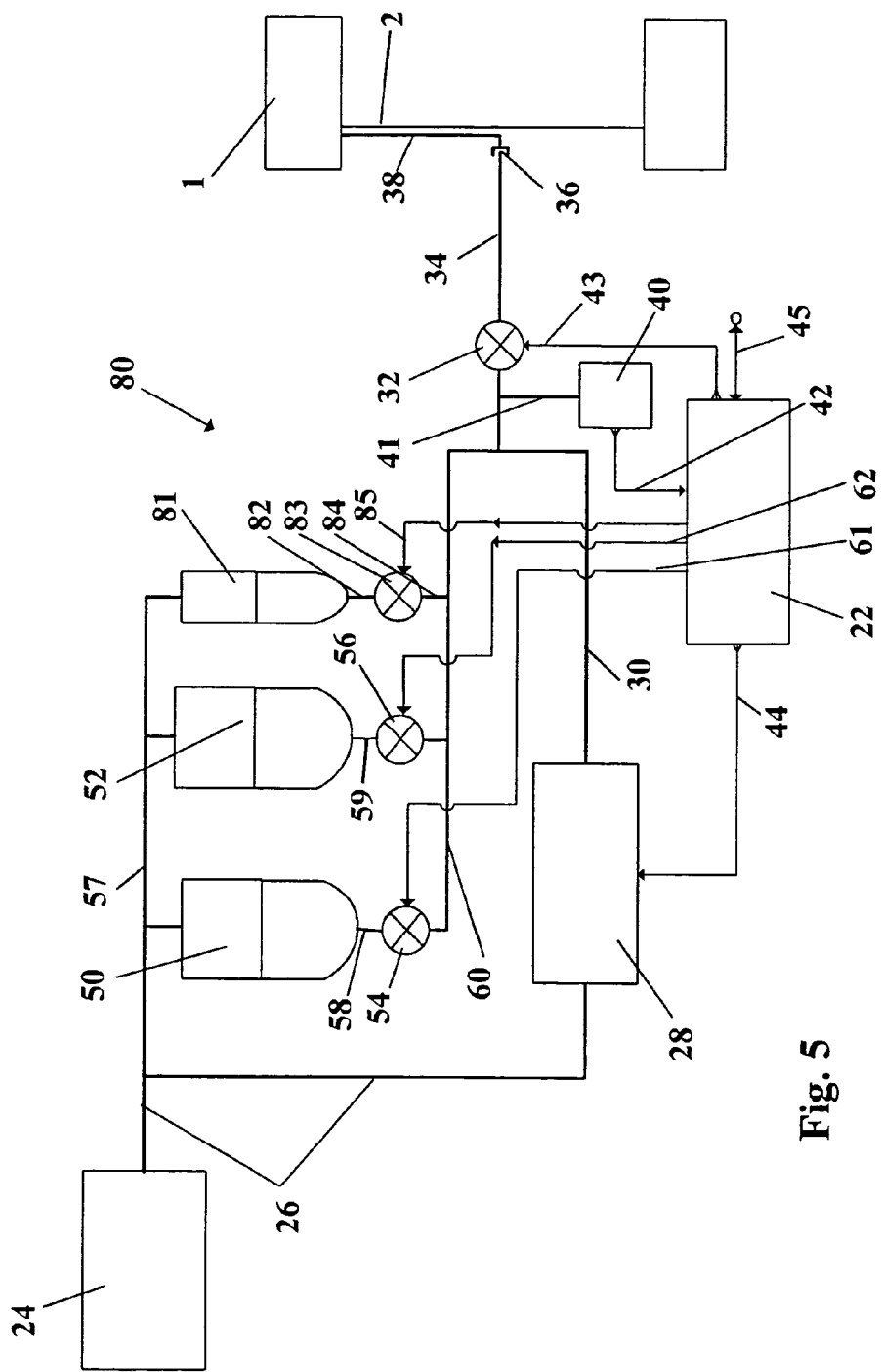
FIG. 5 presents a simplified diagram of third device implementing the invention.

FIG. 5 presents a device 80 according to the invention similar to the one in FIG. 1 but supplemented by a reservoir 81 containing a supplementary active product intended for example to clean the pipes after the sending of doses of lubricating or sealing products. This reservoir 81 is connected as before to the compressor 24 by the pipe 57 and to the pipe 30 to the pipe 82, the cock 83 and the pipe 84. The cock 84 is connected and controlled by the central control unit 22 by means of the conductor 85.

The main advantages of the device according to the invention are as follows. The majority of punctures are either compensated for or repaired. Work at a garage is in some cases no longer necessary, and hence a saving in time and money is achieved. The tire is mounted without internal lubricant, and the mounting operations are thus simplified, and this also reduces costs. In the case of running flat, the quantity of lubricant can be significantly increased and therefore the range improved. The removal of a tire which has not run flat is effected in the absence of lubricant.

What is claimed is:

1. A centralized system for dealing with phenomena of pressure loss and running flat of a vehicle tire, the tire being part of a mounted assembly including a wheel, the system comprising:
  a central control unit;
  a source of compressed gas configured to deliver compressed gas at a pressure;
  a regulator controlled by the central control unit and configured to regulate the pressure of the compressed gas;
  a pneumatic connection between the source of compressed gas, the regulator, and an internal cavity of the tire;
  at least one active product reservoir, external to the mounted assembly, the active product reservoir being connected between the source of compressed gas and the internal cavity of the tire such that the active product reservoir is in parallel with at least a portion of the pneumatic connection, and the active product reservoir having a cock or valve at an output thereof, the cock or valve being controlled by the central control unit, and said active product being selected from a group consisting of sealing products and lubricating products.

2. The system according to claim 1, in which said system further comprises a means for delivering an adapted additive, said means for delivering an adapted additive being external to the mounted assembly.

3. The system according to claim 2, in which said adapted additive comprises an agent adapted for improving: the conditions of injection of said active product, the action of said active product, and the conditions of dealing with the pressure loss and ultimately running flat of the tire.

4. The device according claim 3, in which said adapted additive comprises a cleaning agent.

5. The device according to claim 3, in which said adapted additive comprises an anti-corrosion agent.

6. The system according claim 3, in which said adapted additive comprises a cooling agent.

7. The system according to claim 1, in which said active product comprises a material selected from the group consisting of air, an inert gas, and a non-toxic hydrocarbon, and said active product is not detrimental to the environment and is nonflammable in the compressed state.

8. The system according to claim 1, in which said system comprises a source of cooling product intended to be brought into the internal cavity of the tire in the event of running flat.

9. The system according to claim 1, further comprising:
a means for measuring a representative characteristic of the internal air of the tire and generating at least one representative signal on the state of the air in the internal cavity of the tire,
a means for controlling said system comprising at least a memory, a comparator, and a control program,
wherein said control program is adapted to:
receive and process a pressure signal;
compare said pressure signal with a pressure reference loaded in said memory; and
initiate, according to the result of said comparison, the delivering into the tire of the active product.

10. The system according to claim 9, in which said pressure reference comprises information in terms of a pressure value, a difference in pressure with respect to a reference pressure, and the rate of pressure variation with time.

11. The device according to claim 9, in which the means for measuring said characteristic of the internal air of the tire and generating the pressure signal are affixed to mounted assembly.

12. The system according to claim 9, in which the means for measuring the characteristics of the internal air in the tire and generating the pressure signal, are situated outside the mounted assembly.

13. The device according to claim 9, in which said means for generating the pressure signal incorporates a means for measuring the temperature of the air in the internal cavity of the tire and its change over time.

14. The system according to claim 1, in which said source of compressed gas further comprises a reservoir of a compressed gas which is not detrimental to the environment.

15. The system according to claim 1, in which said source of compressed gas comprises a compressor.

16. The system according to claim 15, in which said compressor is adapted to supply inflation air and cooling air to the tire.

17. The system according to claim 1, further comprising:
a memory and a program in said central control unit, both adapted to manage and implement variable combinations of inflation air, active product and adapted additive.

18. A method for dealing with phenomena of loss of pressure and running flat of a tire on a vehicle, the tire being part of a mounted assembly including a wheel, the method comprising the steps of:
measuring a representative characteristic of the internal air of the tire,
generating a pressure signal based on the state of the inflation air in the internal cavity of the tire,
feeding a compressed gas, from a source of compressed gas configured to deliver compressed gas at a pressure regulated by a regulator, and at least one active product, into the internal cavity of a tire from a reservoir that is external to the mounted assembly, the active product reservoir being connected between the source of compressed gas and the internal cavity of the tire such that the active product reservoir is in parallel with at least a portion of the pneumatic connection, and the active product reservoir having a cock or valve at an output thereof, the cock or valve being controlled by a central control unit, and said active product being selected from a group consisting of sealing products and lubricating products;
controlling said feeding using the central control unit, which has at least a memory, a comparator and a control program, by the steps of:
receiving and processing said pressure signal;
comparing said pressure signal with a pressure reference loaded in said memory; and
controlling said feeding step according to said program.

19. The method according to claim 18, in which said pressure reference comprises information in terms of pressure value, difference in pressure with respect to a reference pressure, and rate of pressure variation.

20. The method according to claim 18, further comprising the step of feeding a predetermined dose of active sealing product into the internal cavity of said tire when the result of said comparison step is abnormal.

21. The method according to claim 20, further comprising the step of said control means transmitting a puncture alarm to a vehicle driver.

22. The method according to claim 20, in which said comparing step is abnormal when the difference between said pressure signal and said reference pressure is greater than a given threshold.

23. The method according to claim 20, in which the result of said comparing step is deemed abnormal when the variation in said pressure signal measured over a given time is greater than a given threshold.

24. The method according to claim 18, further comprising the step of said control means supplying a predetermined dose of active lubricating product into the internal cavity of said tire when said comparing step indicates a condition of flat-running.

25. The method according to claim 24, further comprising the step of said control means transmitting a flat-running alarm to a vehicle driver.

26. The method according to claim 24, in which the control means supplies a flow of cooling gas into the internal cavity of said tire.

27. The method according to claim 24, in which said representative characteristic comprises a temperature of the air in the internal cavity of the tire and further comprising the steps of:
transmitting said temperature to said control means,
comparing in said control means said temperature to a predetermined threshold, and supplying a dose of lubricant when said temperature exceeds said threshold.

28. The method according to claim 27, further comprising the steps of:

comparing in said control means said temperature to a second predetermined threshold, and transmitting an alarm requesting immediate stoppage transmitted to the driver of the vehicle when said temperature exceeds said second threshold.

* * * * *

UNITED STATES PATENT AND TRADEMARK OFFICE
CERTIFICATE OF CORRECTION

PATENT NO.        : 7,287,565 B2
APPLICATION NO.   : 10/927219
DATED             : October 30, 2007
INVENTOR(S)       : Francois Hottebart et al.

It is certified that error appears in the above-identified patent and that said Letters Patent is hereby corrected as shown below:

COLUMN 4

Line 13, "comprise" should read --comprises--.

COLUMN 6

Line 41, "tages;" should read --tages:--.
    Line 50, "temperature etc)" should read --temperature, etc.)--.

COLUMN 8

Line 39, "threshold a" should read --threshold $\propto$--.

COLUMN 9

Line 67, "111" should read --11--.

COLUMN 11

Line 39, "range of" should read --range--.

COLUMN 12

Line 56, "tire;" should read --tire; and--.

COLUMN 13

Line 29, "tire," should read --tire; and--.
    Line 37, "delivering" should read --delivery--.
    Line 45, "are" should read --is--; and "to mounted" should read --to the mounted--.
    Line 49, "signal, are" should read --signal is--.

UNITED STATES PATENT AND TRADEMARK OFFICE
CERTIFICATE OF CORRECTION

PATENT NO.         : 7,287,565 B2
APPLICATION NO.    : 10/927219
DATED              : October 30, 2007
INVENTOR(S)        : Francois Hottebart et al.

It is certified that error appears in the above-identified patent and that said Letters Patent is hereby corrected as shown below:

<u>COLUMN 14</u>

Line 22, "products;" should read --products; and--.

Signed and Sealed this

Twenty-second Day of July, 2008

JON W. DUDAS
*Director of the United States Patent and Trademark Office*